(12) United States Patent
Da Costa et al.

(10) Patent No.: US 9,715,276 B2
(45) Date of Patent: Jul. 25, 2017

(54) SOUND TO HAPTIC EFFECT CONVERSION SYSTEM USING MULTIPLE ACTUATORS

(75) Inventors: Henry Da Costa, Montreal (CA); Herve Timone, Montreal (CA); Robert Heubel, San Leandro, CA (US); Steve Rank, San Jose, CA (US); Juan Manuel Cruz-Hernandez, Montreal (CA); Danny Grant, Laval (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 13/439,241

(22) Filed: Apr. 4, 2012

(65) Prior Publication Data

US 2013/0265286 A1   Oct. 10, 2013

(51) Int. Cl.
*G06F 3/043* (2006.01)
*G06F 3/01* (2006.01)

(52) U.S. Cl.
CPC .................... *G06F 3/016* (2013.01)

(58) Field of Classification Search
CPC ..... G06F 3/016; G06F 3/167; G06F 2203/014
USPC .............. 340/407.1; 345/156–157, 173, 177; 434/116; 463/30, 42; 700/94; 703/3; 704/240, 278; 710/6; 178/18.04, 19.02; 715/701, 702
See application file for complete search history.

(56) References Cited

U.S. PATENT DOCUMENTS

| | | |
|---|---|---|
| 5,675,709 A | 10/1997 | Chiba |
| 5,684,722 A | 11/1997 | Thorner et al. |
| 5,842,163 A | 11/1998 | Weintraub |
| 6,183,367 B1 | 2/2001 | Kaji et al. |
| 6,285,351 B1 | 9/2001 | Chang et al. |
| 6,422,941 B1 | 7/2002 | Thorner et al. |
| 7,091,948 B2 | 8/2006 | Chang et al. |
| 7,623,114 B2 * | 11/2009 | Rank .............................. 345/156 |
| 7,979,146 B2 | 7/2011 | Ullrich et al. |
| 8,000,825 B2 | 8/2011 | Ullrich et al. |
| 8,378,964 B2 | 2/2013 | Ullrich et al. |
| 8,688,251 B2 * | 4/2014 | Ullrich .................... G06F 3/016 340/407.1 |

(Continued)

FOREIGN PATENT DOCUMENTS

| | | |
|---|---|---|
| CN | 1599925 A | 3/2005 |
| EP | 0144774 A2 | 6/1985 |

(Continued)

OTHER PUBLICATIONS

Extended European Search Report, for corresponding EP Application No. 12154829.1, Dated Jul. 27, 2012.

(Continued)

*Primary Examiner* — Peter D McLoone
(74) *Attorney, Agent, or Firm* — Miles & Stockbridge P.C.

(57) ABSTRACT

A haptic conversion system is provided that analyzes an audio signal, generates a plurality of haptic signals based on the analysis of the audio signal, and plays the generated plurality of haptic signals through a plurality of actuators to produce one or more haptic effects. The haptic conversion system maps the generated plurality of haptic signals to the plurality of actuators based on one or more audio characteristics of the audio signal. Each generated haptic signal includes one or more haptic parameters, and is played at its mapped actuator to generate the one or more haptic effects.

25 Claims, 10 Drawing Sheets

(56) References Cited

U.S. PATENT DOCUMENTS

| | | |
|---|---|---|
| 8,717,152 B2 | 5/2014 | Bhatia et al. |
| 8,754,757 B1 | 6/2014 | Ullrich et al. |
| 8,754,758 B1 | 6/2014 | Ullrich et al. |
| 8,860,563 B2 | 10/2014 | Cruz-Hernandez et al. |
| 9,064,387 B2 | 6/2015 | Bhatia et al. |
| 9,349,378 B2 * | 5/2016 | Bharitkar ............... G10L 19/008 |
| 9,354,704 B2 * | 5/2016 | Lacroix .................. G06F 3/016 |
| 2002/0082754 A1 | 6/2002 | Robichaux et al. |
| 2003/0067440 A1 | 4/2003 | Stephen |
| 2005/0134561 A1 | 6/2005 | Tierling et al. |
| 2007/0079138 A1 | 4/2007 | Chou |
| 2007/0097073 A1 * | 5/2007 | Takashima ............ G06F 3/016 345/156 |
| 2007/0236449 A1 | 10/2007 | Lacroix et al. |
| 2007/0242040 A1 * | 10/2007 | Ullrich ................... G10L 21/06 345/157 |
| 2009/0002315 A1 * | 1/2009 | Chu .............................. 345/156 |
| 2009/0009481 A1 * | 1/2009 | Yatsu et al. .................. 345/173 |
| 2009/0231276 A1 | 9/2009 | Ullrich et al. |
| 2010/0066512 A1 * | 3/2010 | Rank ......................... 340/407.2 |
| 2010/0141408 A1 * | 6/2010 | Doy ........................ G06F 3/016 340/407.2 |
| 2010/0156818 A1 | 6/2010 | Burrough et al. |
| 2010/0231539 A1 * | 9/2010 | Cruz-Hernandez ... G06F 3/0488 345/173 |
| 2010/0287311 A1 | 11/2010 | Cruz-Hernandez et al. |
| 2010/0316228 A1 | 12/2010 | Baran et al. |
| 2011/0102160 A1 | 5/2011 | Heubel et al. |
| 2011/0102161 A1 | 5/2011 | Heubel et al. |
| 2011/0115709 A1 | 5/2011 | Cruz-Hernandez |
| 2011/0128132 A1 | 6/2011 | Ullrich et al. |
| 2011/0169908 A1 * | 7/2011 | Lee ........................ G06F 3/016 348/14.02 |
| 2011/0202155 A1 | 8/2011 | Ullrich et al. |
| 2011/0215913 A1 | 9/2011 | Ullrich et al. |
| 2012/0026114 A1 * | 2/2012 | Lee ........................ G06F 3/016 345/173 |
| 2012/0206247 A1 | 8/2012 | Bhatia et al. |
| 2012/0306631 A1 | 12/2012 | Hughes |
| 2013/0050128 A1 | 2/2013 | Bae et al. |
| 2013/0088339 A1 | 4/2013 | Lim et al. |
| 2013/0131851 A1 | 5/2013 | Ullrich et al. |
| 2013/0207917 A1 | 8/2013 | Cruz-Hernandez et al. |
| 2013/0265286 A1 | 10/2013 | Da Costa et al. |
| 2014/0064516 A1 | 3/2014 | Cruz-Hernandez et al. |
| 2015/0070144 A1 | 3/2015 | Weddle et al. |
| 2015/0070260 A1 | 3/2015 | Saboune et al. |
| 2015/0070261 A1 | 3/2015 | Saboune et al. |
| 2015/0154966 A1 * | 6/2015 | Bharitkar ............... G10L 19/008 381/23 |
| 2015/0355713 A1 * | 12/2015 | Lacroix .................. G06F 3/016 340/407.1 |
| 2016/0063850 A1 * | 3/2016 | Yang ..................... G08B 23/00 340/539.22 |
| 2016/0370862 A1 * | 12/2016 | Colgate .................. G06F 3/016 |

FOREIGN PATENT DOCUMENTS

| | | |
|---|---|---|
| EP | 2136286 A2 | 12/2009 |
| EP | 2487557 A2 | 8/2012 |
| JP | 10-98344 | 4/1998 |
| JP | 10-506508 | 6/1998 |
| JP | 11-196497 | 7/1999 |
| JP | 2005-506613 A | 3/2005 |
| KR | 20010111233 A | 12/2001 |
| WO | 9609617 A1 | 3/1996 |
| WO | 03032289 A1 | 4/2003 |
| WO | 2010104953 A1 | 9/2010 |

OTHER PUBLICATIONS

Bhatia et al., U.S. Appl. No. 13/661,140, filed Oct. 26, 2012.
Tony Fisher, "Butterworth / Bessel / Chebyshev Filters," http://www-users.cs.york.ac.uk/~fisher/mkfilter/trad.html (last visited Jan. 29, 2012).
Ricky Bhatia et al., U.S. Appl. No. 13/366,010, filed Feb. 3, 2012.
Juan Manuel Cruz-Hernandez et al., U.S. Appl. No. 13/365,984, filed Feb. 3, 2012.

* cited by examiner

Actuator One (ERM): Plays back effects that are 100% amplitude, at 10 Hz for 100ms Actuator Two (Piezo): Plays back effects that are 50% amplitude, at 200 Hz for 10ms, but 90ms later than those to actuator one.

SOUND TO HAPTIC EFFECT CONVERSION SYSTEM USING MULTIPLE ACTUATORS

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Such devices can also be configured to play audio data, such as a digital audio signal. For example, such devices can include applications configured to play video data, such as a movie or video game, that contains an audio portion, or audio data, such as a song. Similar to haptics, calls to additional embedded hardware capable of generating audio effects (such as speakers) can be programmed within the OS of the device. Thus, the OS of the device can send a play command through control circuitry to the additional embedded hardware, where the additional embedded hardware then produces the appropriate audio effect.

SUMMARY

One embodiment is directed to a system that converts an audio signal into one or more haptic effects that are played at a plurality of actuators. The system analyzes the audio signal. The system further generates one or more haptic signals based on one or more audio characteristics of the audio signal, where each haptic signal of the one or more haptic signals includes one or more haptic parameters. The system further maps the plurality of haptic signals to a plurality of actuators, wherein each haptic signal is mapped to a corresponding actuator. The system further sends each haptic signal to its mapped actuator. The system further plays each haptic signal at its mapped actuator to generate a haptic effect of the one or more haptic effects.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a haptic conversion system that can analyze an audio signal, generate a plurality of haptic signals based on the analysis of the audio signal, and play the generated plurality of haptic signals through a plurality of actuators to produce one or more haptic effects. The generated plurality of haptic signals can be mapped to the plurality of actuators based on one or more audio characteristics of the audio signal. Each generated haptic signal can include one or more haptic parameters, and can be played at its mapped actuator to generate the one or more haptic effects.

Figure 1:
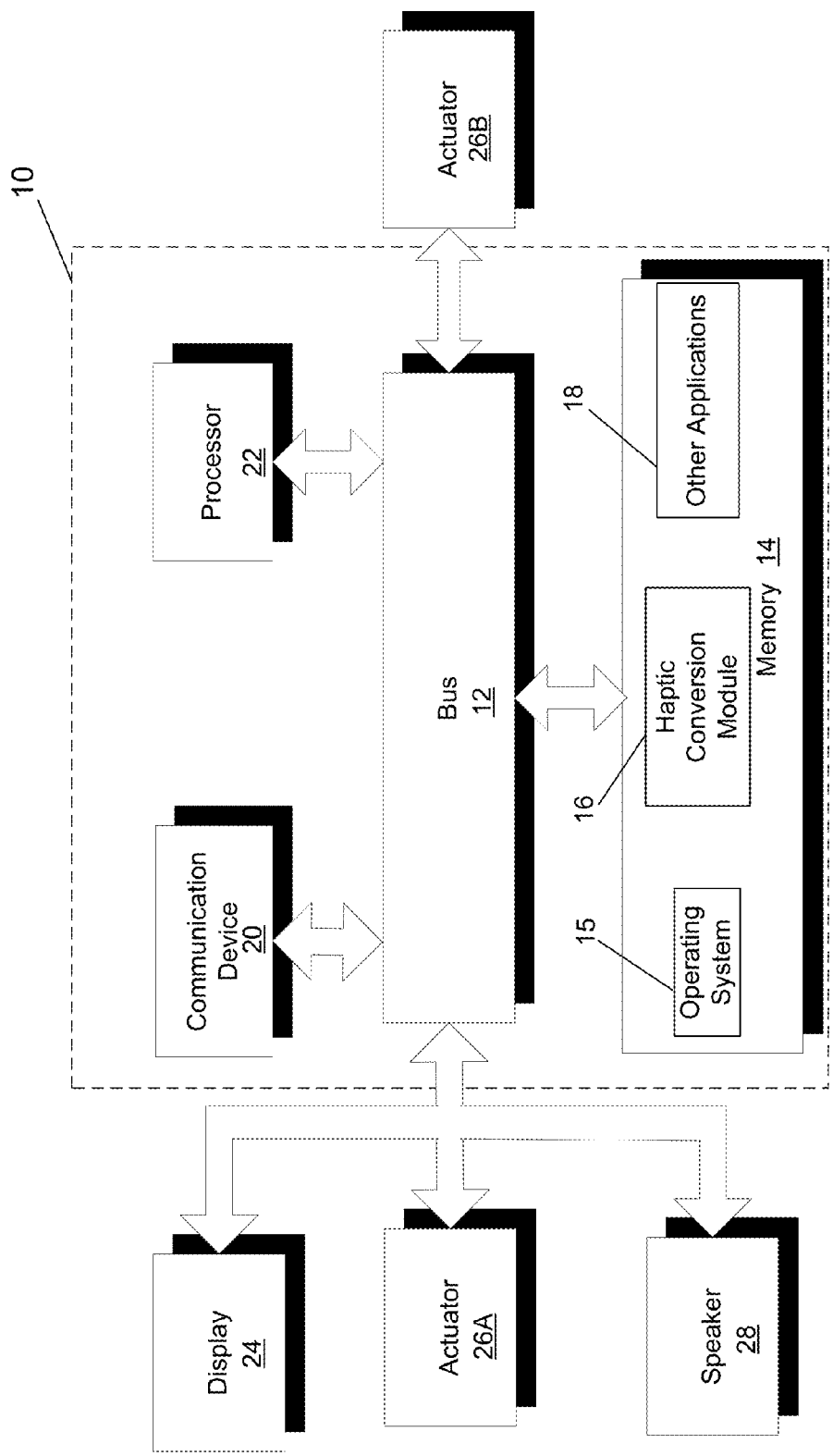
FIG. 1 illustrates a block diagram of a haptic conversion system in accordance with one embodiment of the invention.

FIG. 1 illustrates a block diagram of a haptic conversion system 10 in accordance with one embodiment of the invention. In one embodiment, system 10 is part of a mobile device, and system 10 provides a haptic conversion functionality for the mobile device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic conversion module 16 that converts an audio signal into one or more haptic signals that are used to produce one or more haptic effects at a plurality of actuators, as disclosed in more detail below. In certain embodiments, haptic conversion module 16 can comprise a plurality of modules that each provide specific individual functionality for converting an audio signal into one or more haptic signals that are used to produce one or more haptic effects at a plurality of actuators. System 10 will typically include one or more additional application modules 18 to include additional functionality, such as Integrator® Haptic Development Platform by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10 further includes a plurality of actuators 26 (e.g., actuators 26A and 26B). One of ordinary skill in the art would readily appreciate that in the illustrated embodiment of FIG. 1, the plurality of actuators 26 includes two actuators (i.e., actuators 26A and 26B), but that in alternate embodiments, the plurality of actuators 26 can include any number of actuators. Processor 22 may transmit a haptic signal associated with a haptic effect to one or more actuators of the plurality of actuators 26, where each actuator of the one or more actuators, in turn, outputs haptic effects. Each actuator of the plurality of actuators 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. Furthermore, each actuator of the plurality of actuators 26 may be of a different actuator type.

In some embodiments, system 10 further includes one or more speakers 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Figure 2:
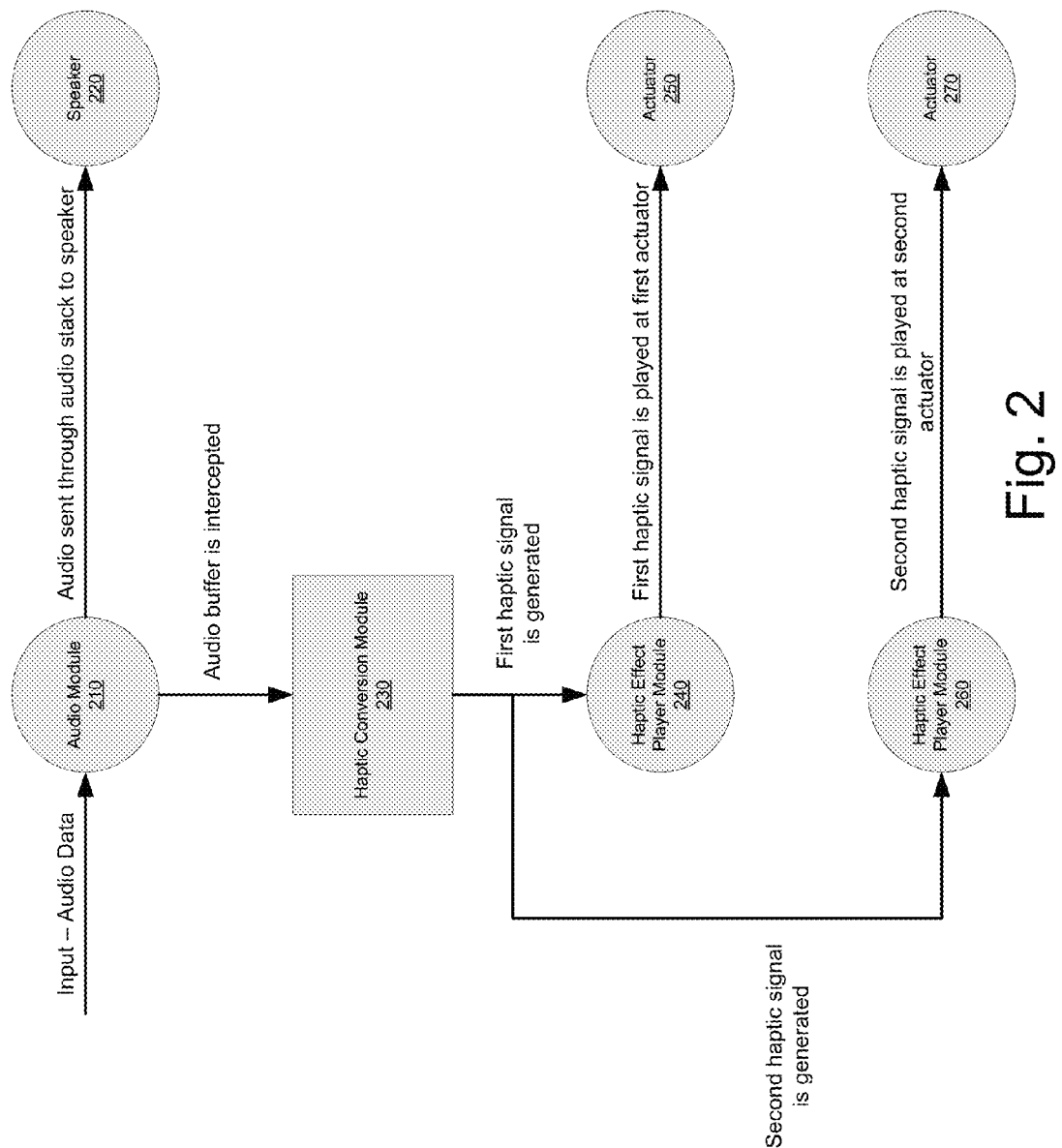
FIG. 2 illustrates an architecture diagram of a haptic conversion system, according to one embodiment of the invention.

FIG. 2 illustrates an architecture diagram of a haptic conversion system, according to one embodiment of the invention. In the illustrated embodiment, the haptic conversion system includes audio module 210 and speaker 220. Audio module 210 is a module of an operating system for a device (such as a mobile device) configured to receive one or more audio buffers, and stream the one or more audio buffers to speaker 220, where each audio buffer comprises one or more audio data frames. In certain embodiments, the one or more audio buffers are digital audio buffers, such as pulse-code modulation ("PCM") audio buffers, where each PCM audio buffer comprises one or more PCM audio data frames. In other embodiments, the one or more audio buffers are structure-based audio buffers, such as Musical Instrument Digital Interface ("MIDI") audio buffers, where each MIDI audio buffer comprises one or more MIDI audio data frames. In yet other embodiments, the one or more audio buffers are frequency domain audio buffers, such as MPEG-2 Audio Layer III ("MP3") audio buffers, where each MP3 audio buffer comprises one or more MP3 audio data frames. In yet other embodiments, the one or more audio buffers are of any other audio formats known to one of ordinary skill in the art. In one embodiment, audio module 210 is an Android AudioTrack module of an Android® operating system for a mobile device.

Speaker 220 is a speaker configured to receive one or more audio buffers and configured to output one or more audio effects. Speaker 220 can be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

The haptic conversion system also includes a haptic conversion module 230, according to the embodiment. In certain embodiments, haptic conversion module 230 is identical to haptic conversion module 16 of FIG. 1. According to the embodiment, haptic conversion module 230 is configured to intercept the one or more audio buffers that audio module 210 streams to speaker 220. Haptic conversion module 230 is further configured to analyze the one or more audio buffers. More specifically, haptic conversion module 230 is configured to analyze the one or more audio data frames contained within the one or more audio buffers. According to the embodiment, haptic conversion module 230 is configured to analyze one or more audio characteristics of each audio data frame of the one or more audio data frames. In an example embodiment, haptic conversion module 230 is configured to analyze one or more of the following audio characteristics of each audio data frame: an amplitude of the audio data frame, a frequency of the audio data frame, or a duration of the audio data frame. In certain embodiments, haptic conversion module 230 can transform the one or more audio buffers from a first audio format to a second audio format before analyzing one or more audio characteristics of each audio data frame of the one or more audio data frames. Further details of the analysis processing performed by the haptic conversion module 230 are described in U.S. application Ser. No. 13/365,984, "SOUND TO HAPTIC EFFECT CONVERSION SYSTEM USING AMPLITUDE VALUE," the disclosure of which is incorporated by reference herein, and U.S. application Ser. No. 13/366,010, "SOUND TO HAPTIC EFFECT CONVERSION SYSTEM USING WAVEFORM," the disclosure of which is also incorporated by reference herein.

Haptic conversion module 230 is further configured to generate one or more haptic signals based on the analyzed audio characteristics of the one or more audio buffers. According to certain embodiments, a haptic signal is a signal that includes one or more haptic parameters, where the haptic signal, when played at an actuator, causes the actuator to generate one or more haptic effects. In one embodiment, the haptic signal can include one or more of the following haptic parameters: an amplitude of a vibration of an actuator, a duration of a vibration of an actuator, or a frequency of a vibration of an actuator. According to certain embodiments, the one or more haptic parameters can be determined based on the analyzed audio characteristics of the one or more audio buffers. The audio characteristics can include at least one of: an amplitude of an audio data frame, a frequency of an audio data frame, or a duration of an audio data frame. For example, if an audio frame of an audio buffer has a low frequency, a haptic signal can be generated with a haptic frequency parameter that has a low value. Likewise, if the audio frame of the audio buffer has a high frequency, the haptic signal can be generated with a haptic frequency parameter that has a high value. As another example, if an audio frame of an audio buffer has a low amplitude, a haptic signal can be generated with a haptic amplitude parameter that has a low value. Likewise, if the audio frame of the audio buffer has a high amplitude, the haptic signal can be generated with a haptic amplitude parameter of a high value. In some embodiments, the one or more haptic parameters of the haptic signal can be determined based on one or more characteristics of an actuator that the haptic signal can be mapped to. For example, if the haptic signal can be mapped to an actuator that is configured to generate haptic effects that have a high frequency, the haptic signal can be generated with a haptic frequency parameter that has a high value. In other embodiments, the haptic signal can include a waveform, where a waveform is a set of one or more signal values in a format, such as a PCM format.

In certain embodiments, the one or more generated haptic signals are the same haptic signal. More specifically, in these embodiments, the one or more generated haptic signals includes identical haptic parameters (i.e., haptic parameters with identical values). In other embodiments, each of the one or more generated haptic signals are different haptic signals. More specifically, in these embodiments, each generated haptic signal includes different haptic parameters (i.e., haptic parameters with different values). In yet other embodiments, some of the one or more generated haptic signals are the same signal, and some are different haptic signals.

Haptic conversion module 230 is further configured to map the one or more generated haptic signals to a plurality of actuators. According to the embodiment, for each generated haptic signal, one or more actuators are identified from a plurality of actuators, and each generated haptic signal is mapped to the identified one or more actuators. For example, a haptic signal that is generated for an audio frame of the audio buffer that has a low frequency can be mapped to a first actuator (e.g., an ERM actuator), while a haptic signal that is generated for an audio frame of the audio buffer that has a high frequency can be mapped to a second actuator (e.g., a piezoelectric actuator). In certain embodiments, the mapping is system-defined, and can be based on either one or more audio characteristics of the analyzed audio characteristics of the one or more audio buffers, or a combination of said one or more audio characteristics and one or more characteristics of each identified actuator. In other embodiments, the mapping is user-defined, where a user of the haptic conversion system can map one or more audio characteristics of an audio signal to either one or more actuator types, or one or more specific actuators.

The haptic conversion system also includes haptic effect player modules 240 and 260, and actuators 250 and 270. One of ordinary skill in the art would readily appreciate that this is merely an example embodiment, and that in alternate embodiments, the haptic conversion system can include any numbers of haptic effect player modules and any number of actuators.

Haptic effect player modules 240 and 260 are examples of a module that is embedded within a device (such as a mobile device), and that is configured to play one or more haptic effects at one or more actuators by sending one or more haptic signals to the one or more actuators. In the illustrated embodiment, haptic effect player modules 240 and 260 are each configured to play one or more haptic effects at a single actuator. However, this is merely an example embodiment, and in alternate embodiments, a haptic effect player module can be configured to play one or more haptic effects at a plurality of actuators. In one embodiment, a haptic effect player module (such as haptic effect player modules 240 and 260) is a TouchSense® Player module by Immersion Corporation.

Actuators 250 and 270 are examples of an actuator configured to receive one or more haptic signals, and configured to output one or more haptic effects. In certain embodiments, an actuator (such as actuators 250 and 270) is an actuator configured to receive a single control parameter (such as an amplitude parameter, a frequency parameter, or a duration parameter), where the single control parameter is used to control a periodic effect when played through the actuator. In other embodiments, an actuator (such as actuators 250 and 270) is an actuator configured to receive a waveform, where the waveform is used to control a waveform effect when played through the actuator. An actuator can be, for example, an electric motor, an electro-magnetic actuator, a voice coil, a shape memory alloy, an electro-active polymer, a solenoid, an ERM, a LRA, a piezoelectric actuator, a high bandwidth actuator, or an EAP actuator. Furthermore, in certain embodiments, actuator 250 can be an actuator of a first type, and actuator 270 can be an actuator of a second type. In alternate embodiments where the haptic conversion system includes a plurality of actuators, where there are more than two actuators, each actuator of the plurality of actuators can each be of a different actuator type.

According to the embodiment, each generated haptic signal of the one or more generated haptic signals is sent to a haptic effect player module. In the illustrated embodiment, a first generated haptic signal is sent to haptic effect player module 240, and a second generated haptic signal is sent to haptic effect player module 260. The haptic effect player module then sends the generated haptic signal to a respective actuator, where the generated haptic signal causes the actuator to play one or more haptic effects. In the illustrated embodiment, haptic effect player module 240 sends the first generated haptic signal to actuator 250, and causes actuator 250 to play one or more haptic effects, and haptic effect player module 260 sends the second generated haptic signal to actuator 270, and causes actuator 270 to play one or more haptic effects.

In embodiments where the one or more audio buffers are structure-based audio buffers or frequency domain audio buffers, each audio data frame of the one or more data frames of the one or more audio buffers can include one or more channels within the audio data frame. In these embodiments, haptic conversion module 230 can perform a channel analysis, where each channel of the audio data frame is analyzed and a haptic signal is generated for each channel. In these embodiments, each generated haptic signal can be sent to its own haptic effect player module (such as haptic effect player modules 240 and 260), and subsequently sent to its own actuators (such as actuators 250 and 270). For example, where the one or more audio buffers are MIDI audio buffers, each channel of each MIDI audio data frame can represent a different musical instrument. In this example, a haptic signal can be generated for each musical instrument, and can be sent to a distinct actuator to play one or more haptic effects that correspond to each musical instrument.

In certain embodiments, rather than generate one or more haptic signals based on the analyzed audio characteristics of the one or more audio buffers, haptic conversion module 230 can select one or more pre-defined haptic signals contained within a universal haptic layer ("UHL") library (not shown in FIG. 2) that can be stored within haptic conversion module 230, and haptic conversion module 230 can cause the UHL layer to send the one or more pre-defined haptic signals to a haptic effect player module (such as haptic effect player modules 240 and 260), where each pre-defined haptic signal is subsequently sent to its own actuator (such as actuators 250 and 270). In these embodiments, rather than haptic conversion module 230 generating the one or more haptic parameters of the haptic signal, the one or more haptic parameters are pre-defined within each pre-defined haptic signal, and haptic conversion module 230 selects each pre-defined haptic signal based on the analyzed audio characteristics of the one or more audio buffers.

In certain embodiments, as previously described, haptic conversion module 230 can generate one or more haptic signals, and send each haptic signal to an actuator (via a haptic effect player module), where the haptic signal is used to play one or more haptic effects at the actuator. However, in alternate embodiments, haptic conversion module 230 can first generate a single haptic signal, divide the single haptic signal into a plurality of haptic signal components, and send each haptic signal component to an actuator (via a haptic effect player module), where the haptic signal component is used to play one or more haptic effects at the actuator.

In certain embodiments, haptic conversion module 230 is further configured to store one or more definitions, where each definition states that when a primary haptic signal is generated and sent to a primary actuator, a secondary haptic signal is also generated and sent to a secondary actuator, independent of the analysis of the audio signal. The secondary actuator can be used to play one or more haptic effects that "complement" or "round-out" the one or more haptic effects that are played at a primary actuator. According to certain embodiments, each definition of the one or more definitions is a conditional statement that includes a condition and a statement, where the condition is the occurrence of a generation of a primary haptic signal that is to be sent to a primary actuator, and the statement is an instruction to generate a secondary haptic signal that is to be sent to a secondary actuator. In these embodiments, haptic conversion module 230 is further configured to perform post-processing on the primary haptic signal, where the post-processing includes generating a secondary haptic signal and sending the haptic signal to a secondary actuator (via a haptic effect player module).

For example, based on an analysis of an audio signal, haptic conversion module 230 can generate a first haptic signal and can send the haptic signal to an ERM actuator, where the first haptic signal is played at the ERM actuator, and generates a first haptic effect. In addition, independent of the analysis of the audio signal, haptic conversion module 230 can evaluate a condition of a definition, and based on the generation of the first haptic signal for the ERM actuator, can determine that the statement of the definition needs to be executed. The statement can include an instruction to generate a second haptic signal and send the second haptic signal to a piezoelectric actuator. Based on the statement of the definition, haptic conversion module 230 can generate the second haptic signal and send to the second haptic signal to the piezoelectric actuator, where the second haptic signal is played at the piezoelectric actuator, and generates a second haptic effect. According to the example, the second haptic effect that is output by the piezoelectric actuator can be used to "complement" or "round out" the first haptic effect that is output by the ERM actuator. Thus, the one or more definitions that can be stored within haptic conversion module 230 can be used to customize one or more haptic effects to create a "themed" output.

In certain embodiments, the secondary haptic effects are played at the secondary actuator subsequent to the primary haptic effects being played at the primary actuator. In other embodiments, the secondary haptic effects are played at the secondary actuator before the primary haptic effects are played at the primary actuator. In certain embodiments, the secondary actuator is a different actuator type than the primary actuator.

Figure 3:
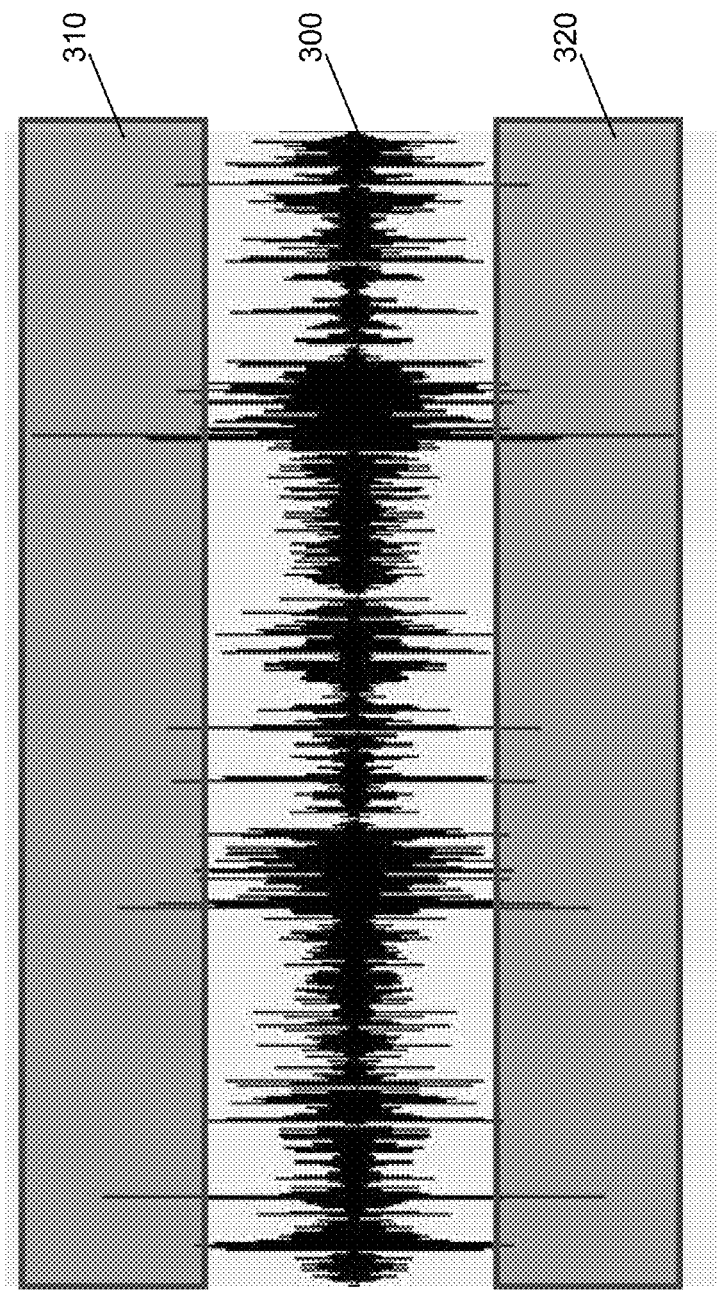
FIG. 3 illustrates an example of a haptic conversion system that analyzes an audio signal and uses an analysis of a single audio characteristic to output one or more haptic signals to two or more actuators at the same time, according to one embodiment of the invention.

FIG. 3 illustrates an example of a haptic conversion system that analyzes an audio signal and uses an analysis of a single audio characteristic to output one or more haptic signals to two or more actuators at the same time, according to one embodiment of the invention. According to the illustrated embodiment, the haptic conversion system includes two actuators: a 4 mm ERM actuator (i.e., "Actuator One") and an 8 mm ERM actuator (i.e., "Actuator Two"). An audio signal 300 is analyzed by the haptic conversion system, and the haptic conversion system identifies components of audio signal 300 that have specific amplitude peaks as indicated by areas 310 and 320 in FIG. 3. Based on an analysis of audio signal 300, the haptic conversion system generates a haptic signal that is sent to Actuator One, and that causes Actuator One to play back one or more haptic effects that are at an amplitude of 100%, a frequency of 10 Hz, and a duration of 100 ms. Furthermore, also based on the analysis of audio signal 300, the haptic conversion system generates a haptic signal that is sent to Actuator Two, and that causes Actuator Two to play back one or more haptic effects that are at an amplitude of 50%, a frequency of 20 Hz, and a duration of 25 ms. In the illustrated embodiment, Actuator One and Actuator Two both play back their haptic effects at the same time. Thus, the illustrated embodiment of FIG. 3 illustrates that the haptic conversion system can generate one or more haptic signals that cause one or more haptic effects to be played at two different types of actuators at a same time, where the two actuators have different amplitudes, different frequencies, and different durations.

Figure 4:
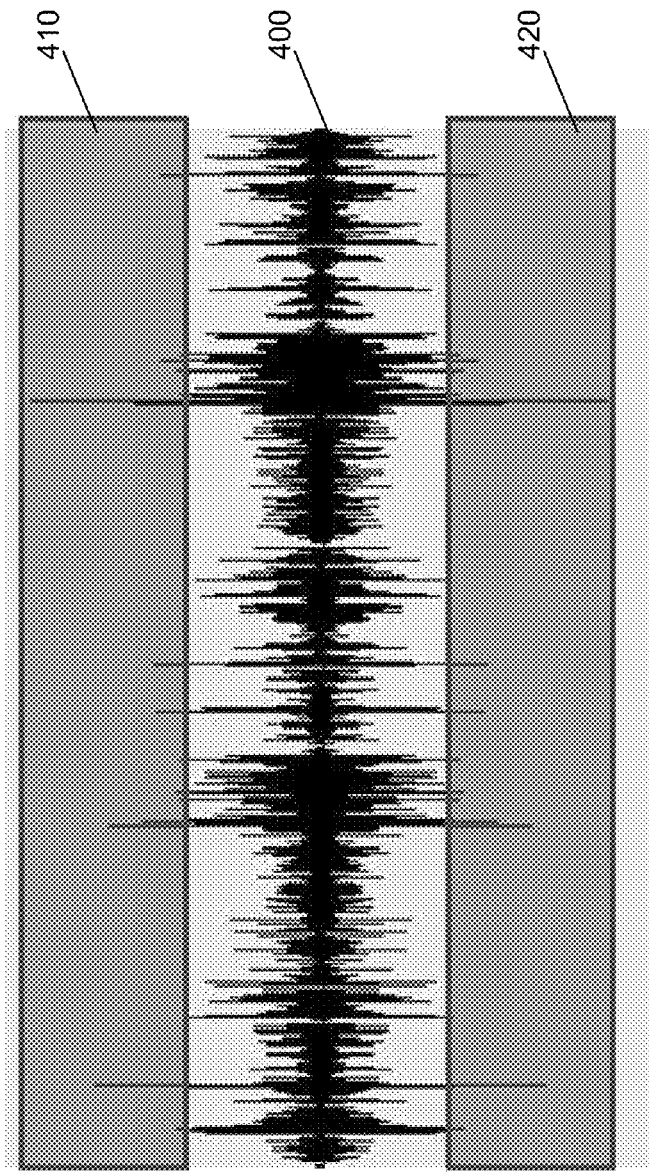
FIG. 4 illustrates an example of a haptic conversion system that analyzes an audio signal and uses an analysis of a single audio characteristic to output one or more haptic signals to two or more actuators at different times, according to one embodiment of the invention.

FIG. 4 illustrates an example of a haptic conversion system that analyzes an audio signal and uses an analysis of a single audio characteristic to output one or more haptic signals to two or more actuators at different times, according to one embodiment of the invention. According to the illustrated embodiment, the haptic conversion system includes two actuators: an ERM actuator (i.e., "Actuator One") and a piezoelectric actuator (i.e., "Actuator Two"), which are different from the actuators in the example illustrated in FIG. 3. An audio signal 400 is analyzed by the haptic conversion system, and the haptic conversion system identifies components of audio signal 400 that have specific amplitude peaks as indicated by areas 410 and 420 in FIG. 4. Based on an analysis of audio signal 400, the haptic conversion system generates a haptic signal that is sent to Actuator One, and that causes Actuator One to play back one or more haptic effects that are at an amplitude of 100%, a frequency of 10 Hz, and a duration of 100 ms. Furthermore, also based on the analysis of audio signal 400, the haptic conversion system generates a haptic signal that is sent to Actuator Two, and that causes Actuator Two to play back one or more haptic effects that are at an amplitude of 50%, a frequency of 200 Hz, and a duration of 10 ms. Furthermore, the one or more haptic effects that are played by Actuator Two are played 90 ms later than the one or more haptic effects that are played by Actuator One. In certain embodiments, the staggered playback of Actuators One and Two can compensate for a difference in playback speeds of Actuators One and Two. Thus, in these embodiments, a user can experience synchronized playback even though the one or more effects of each actuator are played at different times. Thus, the illustrated embodiment of FIG. 4 illustrates that the haptic conversion system can generate one or more haptic signals that cause one or more haptic effects to be played at two different types of actuators at two different times, where the two actuators have different amplitudes, different frequencies, and different durations.

Figure 5:
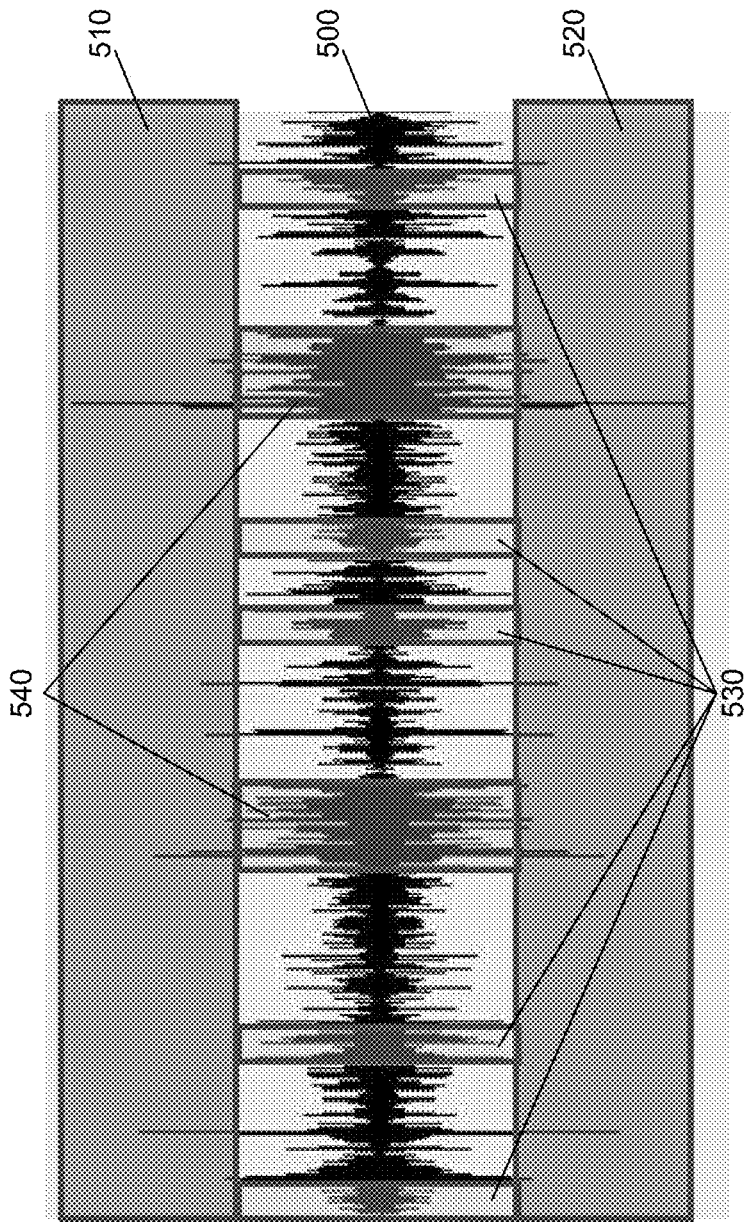
FIG. 5 illustrates an example of a haptic conversion system that analyzes an audio signal and uses an analysis of multiple audio characteristics to output one or more haptic signals to two or more actuators at the same time or at different times, according to one embodiment of the invention.

FIG. 5 illustrates an example of a haptic conversion system that analyzes an audio signal and uses an analysis of multiple audio characteristics to output one or more haptic signals to two or more actuators at the same time or at different times, according to one embodiment of the invention. According to the illustrated embodiment, the haptic conversion system includes two actuators: an ERM actuator (i.e., "Actuator One") and a piezoelectric actuator (i.e., "Actuator Two"). An audio signal 500 is analyzed by the haptic conversion system, and the haptic conversion system identifies: (a) components of audio signal 500 that have specific amplitude peaks as indicated by areas 510 and 520 in FIG. 5; (b) components of audio signal 500 that have specific frequencies as indicated by areas 530; and (c) components of audio signal 500 that have specific durations as indicated by areas 540.

Based on an analysis of audio signal 500 (in particular, components of audio signal 500 that have specific durations as indicated by areas 540), the haptic conversion system generates a haptic signal that is sent to Actuator One, and that causes Actuator One to play back one or more haptic effects that are at an amplitude of 100%, a frequency of 10 Hz, and a duration of 100 ms. Furthermore, also based on the analysis of audio signal 500 (in particular, components of audio signal 500 that have specific frequencies as indicated by areas 530), the haptic conversion system generates a haptic signal that is sent to Actuator Two, and that causes Actuator Two to play back one or more haptic effects that are at an amplitude of 50%, a frequency of 200 Hz, and a duration of 10 ms, where the one or more haptic effects that are played by Actuator Two are played 90 ms later than the one or more haptic effects that are played by Actuator One. In certain embodiments, the staggered playback of Actuators One and Two can compensate for a difference in playback speeds of Actuators One and Two. Thus, in these embodiments, a user can experience synchronized playback even though the one or more effects of each actuator are played at different times.

Furthermore, also based on the analysis of audio signal 500 (in particular, components of audio signal 500 that have specific amplitude peaks as indicated by areas 510 and 520 in FIG. 5), the haptic conversion system generates a haptic signal that is sent to both Actuators One and Two (or in alternate embodiments, a third actuator which is not shown in FIG. 5), where the haptic signal causes both Actuators One and Two (or the third actuator in alternate embodiments) to generate one or more haptic effects. The one or more haptic effects that are based on components of audio signal 500 that have specific amplitude peaks can be based on the same haptic parameters (e.g., amplitude, frequency, and duration) as either: (a) the one or more haptic effects that are based on components of audio signal 500 that have specific durations; or (b) the one or more haptic effects that are based on components of audio signal 500 that have specific frequencies. Alternatively, the one or more haptic effects that are based on components of audio signal 500 that have specific amplitude peaks can be based on different haptic parameters. Furthermore, the one or more haptic effects that are based on components of audio signal 500 that have specific amplitude peaks can be played at a same time as either: (a) the one or more haptic effects that are based on components of audio signal 500 that have specific durations; or (b) the one or more haptic effects that are based on components of audio signal 500 that have specific frequencies. Alternatively, the one or more haptic effects that are based on components of audio signal 500 that have specific amplitude peaks can be played at a different time.

Thus, the illustrated embodiment of FIG. 5 illustrates that the haptic conversion system can generate one or more haptic signals that cause one or more haptic effects to be played at two or more different types of actuators at two different times, where the two or more actuators have different amplitudes, different frequencies, and different durations.

Figure 6:
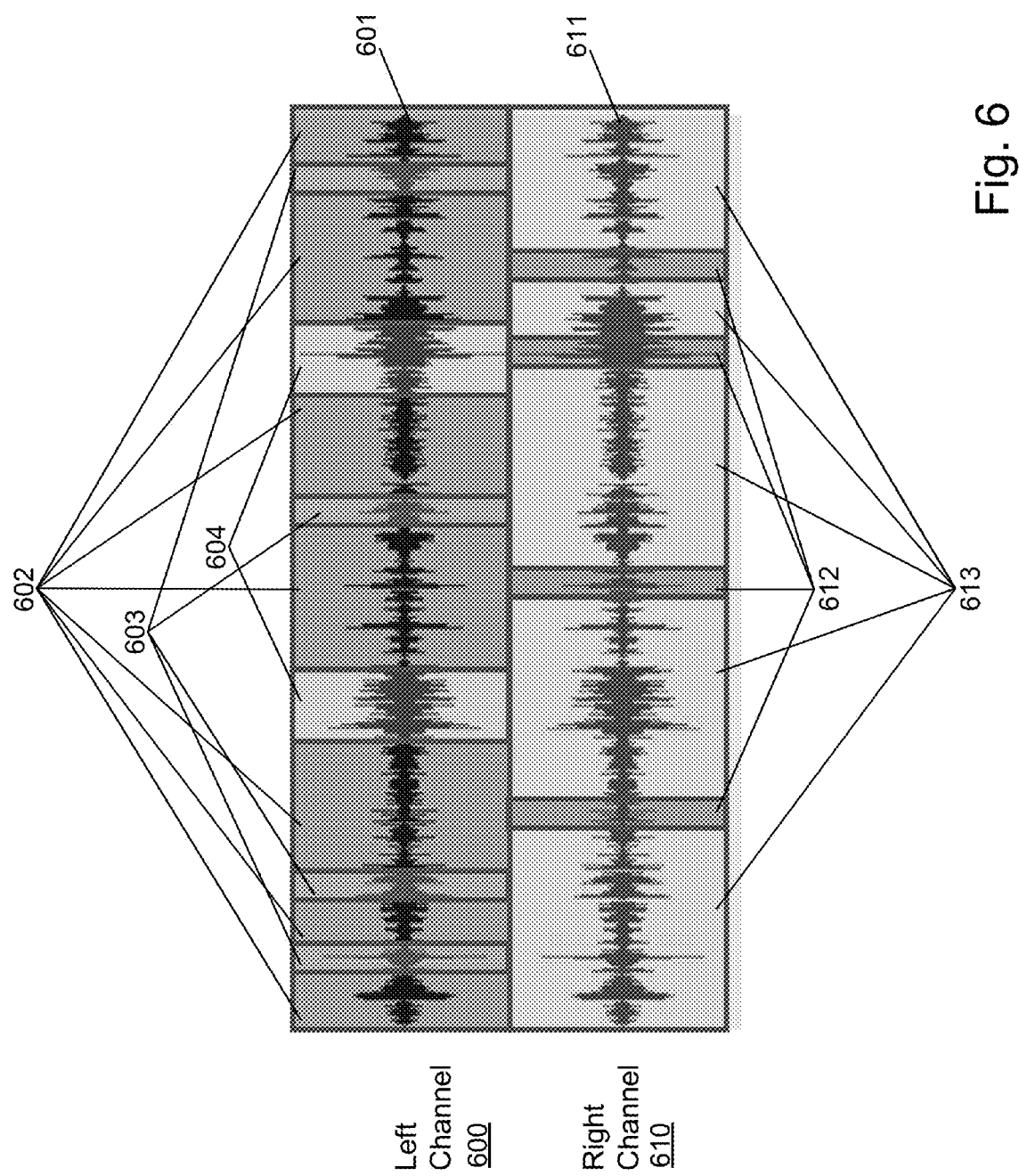
FIG. 6 illustrates an example of a haptic conversion system that analyzes a multi-channel audio signal and uses an analysis of one or more audio characteristics to output one or more haptic signals to two or more actuators at the same time or at different times, according to one embodiment of the invention.

FIG. 6 illustrates an example of a haptic conversion system that analyzes a multi-channel audio signal and uses an analysis of one or more audio characteristics to output one or more haptic signals to two or more actuators at the same time or at different times, according to one embodiment of the invention. An audio signal includes a left channel 600 and a right channel 610, where the audio signal includes a portion of the audio signal contained within left channel 600 (i.e., audio signal 601), and a portion of the audio signal contained with right channel 610 (i.e., audio signal 611). The number of channels within the audio signal illustrated in FIG. 6 is only an example number, and in alternate embodiments, an audio signal can have any number of channels. Audio signal 601 is analyzed by the haptic conversion system, and the haptic conversion system identifies: (a) components of audio signal 601 that have specific amplitude peaks as indicated by areas 602 in FIG. 6; (b) components of audio signal 601 that have specific frequencies as indicated by areas 603; and (c) components of audio signal 601 that have specific durations as indicated by areas 604. Similarly, audio signal 602 is analyzed by the haptic conversion system, and the haptic conversion system identifies: (a) components of audio signal 602 that have specific amplitude peaks as indicated by areas 612 in FIG. 6; and (b) components of audio signal 602 that have specific frequencies as indicated by areas 613.

Based on the analysis of audio signals 601 and 602, the haptic conversion system generates one or more haptic signals that are sent to one or more actuators, where the one or more haptic signals cause the one or more actuators to generate one or more haptic effects. In certain embodiments, a first set of one or more haptic signals are generated based on an analysis of audio signal 601, and are sent to a first set of one or more actuators, and a second set of one or more haptic signals are generated based on an analysis of audio signal 602, and are sent to a second set of one or more actuators. In other embodiments, a first set of one or more haptic signals are generated based on a combined analysis of audio signals 601 and 602, and are sent to a first set of one or more actuators, and a second set of one or more haptic signals are also generated based on a combined analysis of audio signals 601 and 602, and are sent to a second set of one or more actuators. In yet other embodiments, a first set of one or more haptic signals are generated based on an analysis of audio signal 601, a second set of one or more haptic signals are generated based on an analysis of audio signal 602, the first and second sets of haptic signals are combined into a combined set of one or more haptic signals, and the combined set of one or more haptic signals are sent to a set of one or more actuators. In yet other embodiments, audio signals 601 and 602 can be combined into a combined audio signal, and an analysis can be performed on the combined audio signal to generate the one or more haptic signals that are sent to one or more actuators.

Figure 7A:
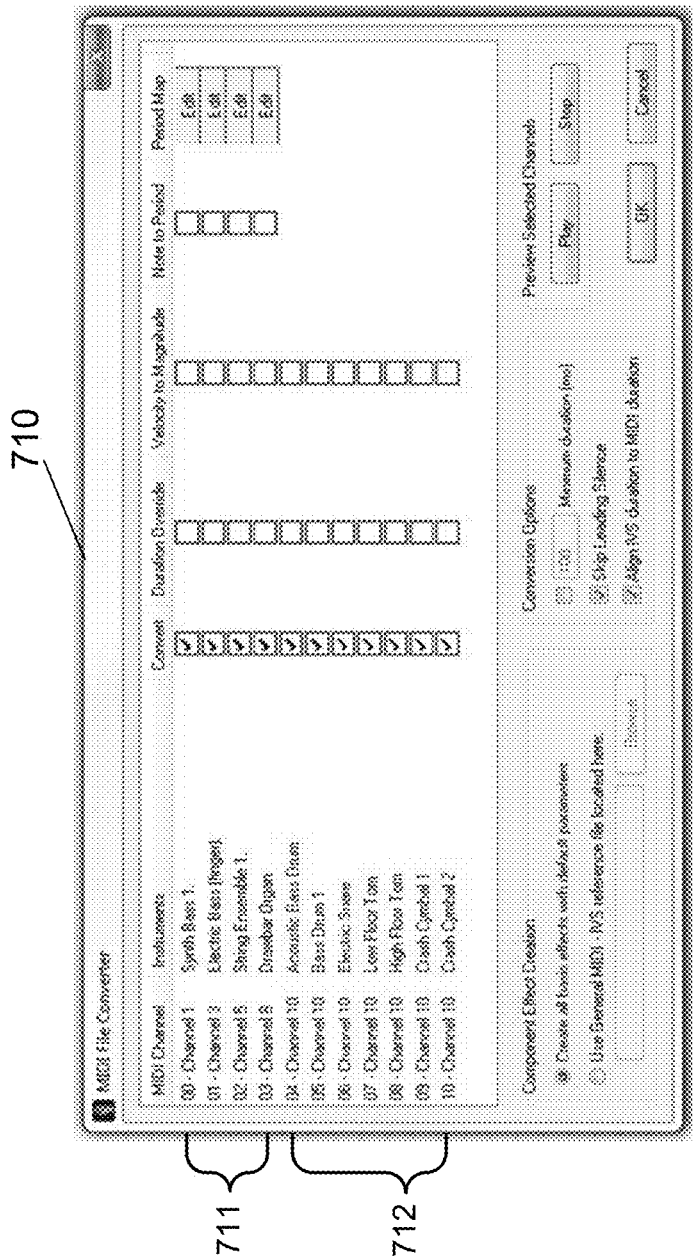
FIG. 7A illustrates an example user interface of a haptic conversion system that analyzes a multi-channel structure-based audio file and uses an analysis of multiple audio characteristics to output one or more haptic signals to two or more actuators at the same time or at different times, according to one embodiment of the invention.

FIG. 7A illustrates an example user interface 710 of a haptic conversion system that analyzes a multi-channel structure-based audio file and uses an analysis of multiple audio characteristics to output one or more haptic signals to two or more actuators at the same time or at different times, according to one embodiment of the invention. User interface 710 displays a multi-channel structure-based audio file conversion options menu for the haptic conversion system. In certain embodiments, the multi-channel structure-based audio file can be a MIDI audio file. User interface 710 can include options for defining one or more haptic effects for multiple actuator types along with defining one or more haptic characteristics for the one or more haptic effects for each actuator. In the illustrated embodiment, the multi-channel structure-based audio file includes a number of channels (i.e., channels, 1, 3, 5, 8, and 10). The number of channels within the multi-channel structure-based audio file illustrated in FIG. 7A is only an example number, and in alternate embodiments, a multi-channel structure-based audio file can have any number of channels. The haptic conversion system can separately analyze each channel. In the illustrated embodiments, channel set 711 represents four channels (i.e., channels 1, 3, 5, and 8) that can be separately analyzed. The haptic conversion system can also separate a channel into a plurality of channel components and separately analyze the channel components. In the illustrated embodiments, channel component set 712 represents a channel (i.e., channel 10) that has been separated into a plurality of channel components, where each channel component can be separately analyzed.

Each channel (or channel component) of the multi-channel structure-based audio file is subsequently analyzed by the haptic conversion system, and the haptic conversion system identifies: (a) components of each channel/channel component that have specific amplitude peaks; (b) components of each channel/channel component that have specific frequencies; and (c) components of each channel/channel component that have specific durations. Based on the analysis of channel set 711 and channel component set 712, the haptic conversion system generates one or more haptic signals that are sent to one or more actuators, where the one or more haptic signals cause the one or more actuators to generate one or more haptic effects.

Figure 7B:
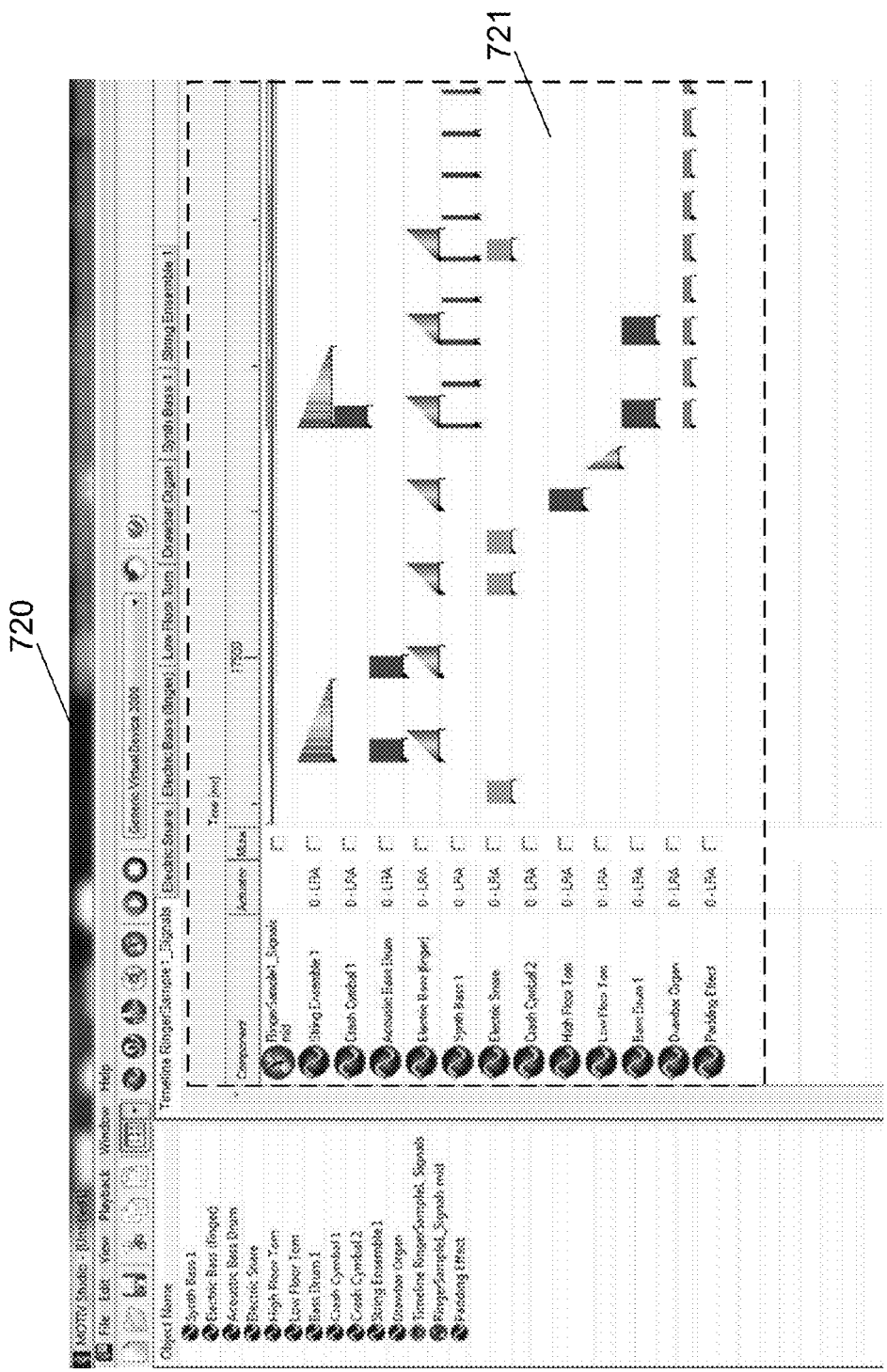
FIG. 7B illustrates another example user interface of a haptic conversion system that analyzes a multi-channel structure-based audio file and uses an analysis of multiple audio characteristics to output one or more haptic signals to two or more actuators at the same time or at different times, according to one embodiment of the invention.

FIG. 7B illustrates another example user interface 720 of a haptic conversion system that analyzes a multi-channel structure-based audio file and uses an analysis of multiple audio characteristics to output one or more haptic signals to two or more actuators at the same time or at different times, according to one embodiment of the invention. User interface 720 displays an a graphical representation of the one or more haptic effects that are generated by the actuators based on the analysis of the multi-channel structure-based audio file previously described in relation to FIG. 7A. As can be seen in FIG. 7B, the one or more haptic effects that are generated at each actuator for each channel (or channel component) of the multi-channel structure-based audio file can be different. In certain embodiments, the multi-channel structure-based audio file can be a MIDI audio file.

Figure 8:
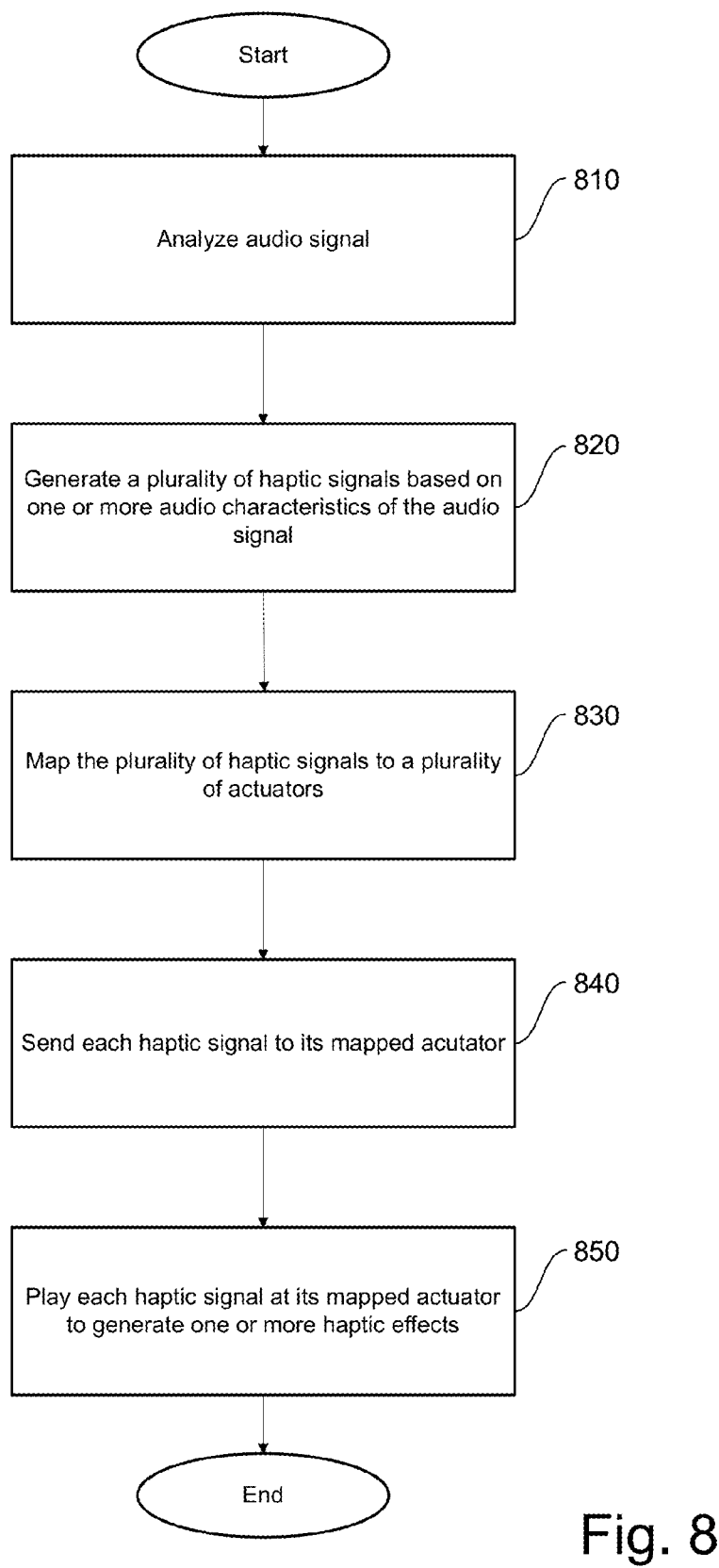
FIG. 8 illustrates a flow diagram of the functionality of a haptic conversion module, according to one embodiment of the invention.

FIG. 8 illustrates a flow diagram of the functionality of a haptic conversion module (such as haptic conversion module 16 of FIG. 1), according to one embodiment of the invention. In one embodiment, the functionality of FIG. 8 is implemented by software stored in memory or another computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in alternate embodiments, the functionality may be performed by hardware using analog components.

The flow begins and proceeds to 810. At 810, an audio signal is analyzed. The audio signal can include one or more audio buffers, where each audio buffer includes one or more audio data frames. In some embodiments, the one or more audio buffers are digital audio buffers. In other embodiments, the one or more audio buffers are structure-based audio buffers. In other embodiments, the one or more audio buffers are frequency domain buffers. As part of the analysis of the audio signal, one or more audio characteristics of each audio data frame of the one or more audio data frames can be analyzed. The one or more audio characteristics can include at least one of an amplitude of the audio data frame, a frequency of the audio data frame, or a duration of the audio data frame. The flow proceeds to 820.

At 820, a plurality of haptic signals is generated based on one or more audio characteristics of the audio signal. Each haptic signal of the plurality of haptic signals can include one or more haptic parameters. In these embodiments, the one or more haptic parameters include at least one of: an amplitude parameter, a duration parameter, or a frequency parameter. In addition, the one or more audio characteristics of the audio signal can include at least one of: an amplitude of an audio data frame, a frequency of an audio data frame, or a duration of an audio data frame. In certain embodiments, the one or more haptic parameters are determined based on one or more audio characteristics of the audio signal.

The plurality of haptic signals can all be the same haptic signal. Alternatively, the plurality of haptic signals can all be different haptic signals. In some embodiments, some of the plurality of haptic signals are the same haptic signal, and the other haptic signals are different haptic signals. In certain embodiments, at least one haptic signal is divided into two more haptic signal components. In other embodiments, at least two haptic signals are combined into a combined haptic signal. In certain embodiments, one or more pre-defined haptic signals can be from a universal haptic layer library based on one or more audio characteristics of audio signal. The flow proceeds to 830.

At 830, the plurality of haptic signals are mapped to the plurality of actuators, where each haptic signal is mapped to a corresponding actuator. In certain embodiments, the mapping is system-defined, where the mapping is based on either one or more audio characteristics of the analyzed audio signal, or a combination of the one or more audio characteristics and one or more characteristics of each actuator of the plurality of actuators. In other embodiments, the mapping is user-defined. In embodiments where haptic signal components, combined haptic signals, pre-defined haptic signals, or a combination therein, have also been generated, these haptic signals are also mapped to their respective corresponding actuators. The flow proceeds to 840.

At 840, each haptic signal of the plurality of haptic signals is sent to its mapped actuator. In embodiments where haptic signal components, combined haptic signals, pre-defined haptic signals, or a combination therein, have also been generated, these haptic signals are also sent to their respective mapped actuators. The flow proceeds to 850.

At 850, each haptic signal of the plurality of haptic signals is played at its mapped actuator to generate a haptic effect of the one or more haptic effects. In certain embodiments, at least one secondary haptic signal is also generated based on a stored definition. According to these embodiments, the definition includes a conditional statement that includes a condition and a statement. The condition is the generation of at least one primary haptic signal that is sent to a primary actuator, and the statement is an instruction to generate the at least one secondary haptic signal that is sent to a secondary actuator. Thus, when at least one of the one or more haptic signals matches the primary haptic signal, the condition is triggered, and the at least one secondary haptic signal is generated. The at least one secondary haptic signal is then mapped to an actuator of the plurality of actuators and sent to the actuator based on the stored definition. The flow then ends.

Figure 9:
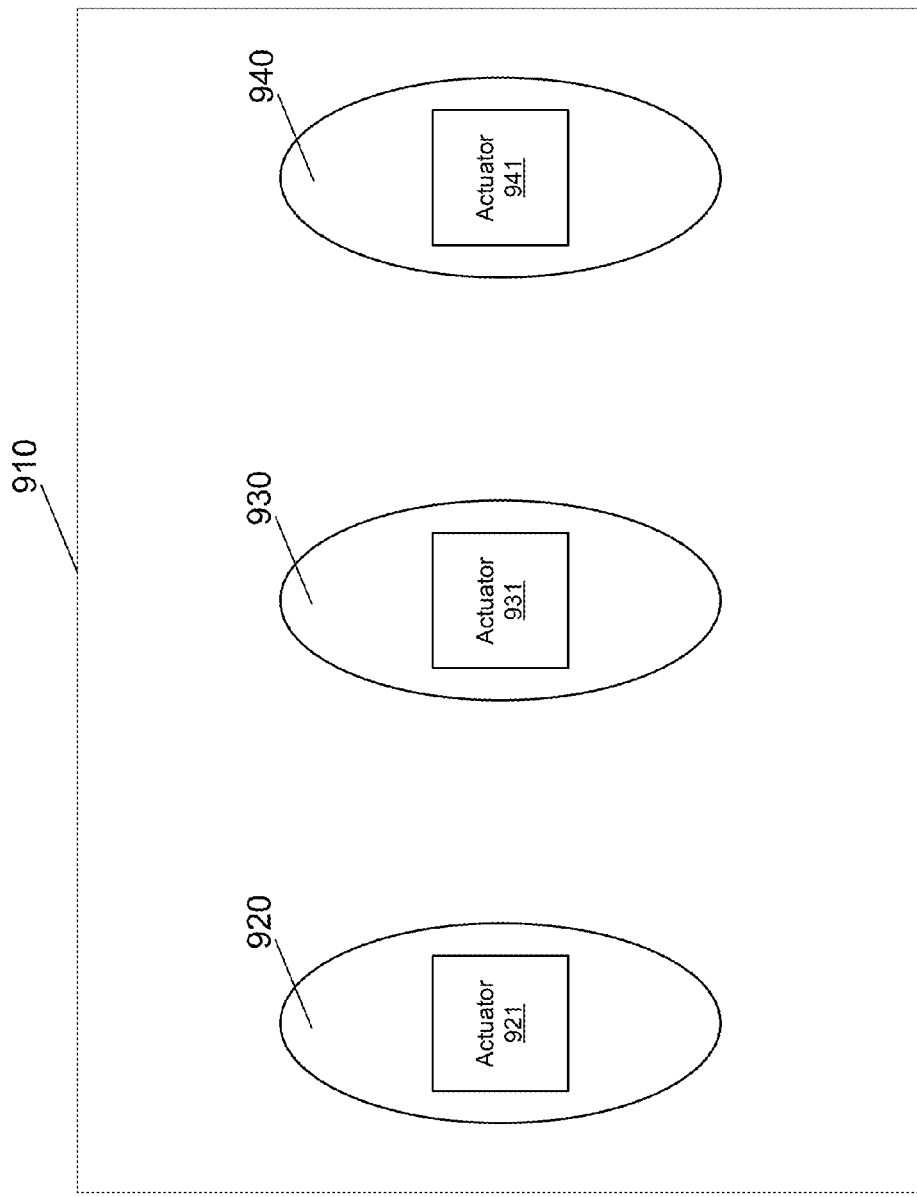
FIG. 9 illustrates a device, according to one embodiment of the invention.

FIG. 9 illustrated a device 910, according to one embodiment of the invention. Device 910 can be a touchscreen device. Device 910 includes a surface that can include a touchscreen and be touch-sensitive, and that includes a plurality of regions. In the illustrated embodiment, device 910 includes regions 920, 930, and 940. Each region of device 910 can include a different type of actuator. In the illustrated embodiment, region 920 includes actuator 921, region 930 includes actuator 931, and region 940 includes actuator 941, where actuators 921, 931, and 941 can be different types of actuators. Actuators 921, 931, and 941 can each output one or more audio effects, where each audio effect (or set of audio effects) is output from a different part of the surface of device 910. In a similar fashion, actuators 921, 931, and 941, can each output one or more haptic effects, where each haptic effect (or set of haptic effects) is output from a different part of the surface of device 910. In certain embodiments, each haptic effect (or set of haptic effects) can be a different haptic effect. For example, each haptic effect (or set of haptic effects) can be of a different frequency.

In certain embodiments, each haptic effect can be as a result of an audio effect being played at a location, such as a location where a finger of a user is interacting with the surface of device 910. In these embodiments, actuators 921, 931, and 941 can each output audio effects and haptic effects at the same time. In certain embodiments, the output haptic effects are generated based on an encoding scheme. In these embodiments, this encoding scheme can be a Dolby Digital encoding scheme that is applied to haptic effects. In alternate embodiments, the haptic encoding is performed as part of the audio encoding by adding low frequency content to the audio information, but stressing the haptic effect.

In alternate embodiments, in addition to actuators 921, 931, and 941, device 910 also includes one or more additional actuators located on the back of device 910 (not shown in FIG. 9). In these embodiments, these additional actuators can be full body actuators that can provide one or more haptic effects at different frequencies.

Thus, according to an embodiment, a haptic conversion system generates a plurality of haptic signals based on an analyzed audio signal, sends each haptic signal to an actuator that the haptic signal is mapped to, and plays each haptic signal at its mapped actuator to generate a haptic effect. According to the embodiment, the sending of the haptic signals based on audio characteristics of the audio signals to multiple actuators significantly increases the "richness" of the haptic experience. More specifically, the application of haptic signals based on audio characteristics of the audio signals on multiple actuators produces a more complete haptic experience.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to convert an audio signal into haptic effects, the converting comprising:
   determining sets of values of audio characteristics of the audio signal, each of the sets of values of audio characteristics comprising at least a frequency, a magnitude, or a duration;
   mapping the sets of values of audio characteristics to actuators, wherein each of the sets of values of audio characteristics is mapped to a different one of the actuators;

generating haptic signals based on the sets of values of audio characteristics, wherein the haptic signals include a haptic signal generated for each of the sets of values of audio characteristics;

sending the haptic signals to a respective one of the actuators based on the mapping of the sets of values of audio characteristics to the actuators; and playing the haptic signals at the actuators to generate the haptic effects;

wherein the haptic effects are generated based on audio effects, wherein at least two of the audio effects are output from different parts of a surface of a device, wherein the haptic effects are played at the actuators included in different regions of the device, wherein at least two of the haptic effects are output from different parts of the surface of the device, wherein the actuators play the haptic effects and the audio effects at the same time, wherein at least one haptic effect is generated based on an audio effect being played at a location where a finger of a user is interacting with the surface of the device.

2. The non-transitory computer-readable medium of claim 1, the converting further comprising:

selecting one or more pre-defined haptic signals from a universal haptic layer library based on the sets of values of audio characteristics of the audio signal;

mapping the one or more pre-defined haptic signals to the actuators, wherein each pre-defined haptic signal is mapped to a corresponding actuator; and sending each pre-defined haptic signal to its mapped actuator.

3. The non-transitory computer-readable medium of claim 1, the converting further comprising:

generating one or more secondary haptic signals based on a stored definition, wherein the definition comprises a conditional statement that comprises a condition and a statement, wherein the condition is the generation of one or more primary haptic signals that are sent to a primary actuator, and the statement is an instruction to generate the one or more secondary haptic signals that are sent to a secondary actuator;

mapping the one or more secondary haptic signals to the secondary actuator; and sending each secondary haptic signal to the secondary actuator based on the stored definition.

4. The non-transitory computer-readable medium of claim 1, the converting further comprising:

dividing at least one haptic signal into haptic signal components;

mapping the haptic signal components to the actuators, wherein each haptic signal component is mapped to a corresponding actuator; and sending the haptic signal components to their mapped actuators.

5. The non-transitory computer-readable medium of claim 1, the converting further comprising:

combining at least two of the haptic signals into a combined haptic signal;

mapping the combined haptic signal to a mapped actuator; and sending the combined haptic signal to the mapped actuator.

6. The non-transitory computer-readable medium of claim 1, wherein haptic parameters of the haptic signals comprise at least one of: an amplitude parameter, a duration parameter, or a frequency parameter.

7. The non-transitory computer-readable medium of claim 1, wherein the determining comprises identifying amplitude peaks of the audio signal.

8. The non-transitory computer-readable medium of claim 7, wherein the sets of values of audio characteristics comprise at least one of: an amplitude of an audio data frame, a frequency of an audio data frame, or a duration of an audio data frame.

9. The non-transitory computer-readable medium of claim 1, wherein the mapping is system-defined.

10. The non-transitory computer-readable medium of claim 1, wherein the mapping is user-defined.

11. The non-transitory computer-readable medium of claim 1, wherein characteristics of each actuator comprise an ability to generate a haptic effect with at least one of: a specified frequency; a specified amplitude; or a specified duration.

12. The non-transitory computer-readable medium of claim 1, wherein a user experiences synchronized playback of the haptic effects.

13. The non-transitory computer-readable medium of claim 1, wherein the audio signal comprises channels;
wherein the generating of the haptic signals further comprises generating distinct haptic signals for the channels of the audio signal;
wherein the sending of the haptic signals to the respective one of the actuators sends a distinct haptic signal to a respective distinct actuator.

14. A computer-implemented method for converting an audio signal into haptic effects, the computer-implemented method comprising:

determining sets of values of audio characteristics of the audio signal, each of the sets of values of audio characteristics comprising at least a frequency, a magnitude or a duration;

mapping the sets of values of audio characteristics to actuators, wherein each of the sets of values of audio characteristics is mapped to a different one of the actuators;

generating haptic signals based on the sets of values of audio characteristics, wherein the haptic signals include a haptic signal generated for each of the sets of values of audio characteristics;

sending the haptic signals to a respective one of the actuators based on the mapping of the sets of values of audio characteristics to the actuators; and playing the haptic signals at the actuators to generate the haptic effects;

wherein the haptic effects are generated based on audio effects, wherein at least two of the audio effects are output from different parts of a surface of a device, wherein the haptic effects are played at the actuators included in different regions of the device, wherein at least two of the haptic effects are output from different parts of the surface of the device, wherein the actuators play the haptic effects and the audio effects at the same time, wherein at least one haptic effect is generated based on an audio effect being played at a location where a finger of a user is interacting with the surface of the device.

15. The computer-implemented method of claim 14, further comprising:

selecting one or more pre-defined haptic signals from a universal haptic layer library based on the sets of values of audio characteristics of the audio signal;

mapping the one or more pre-defined haptic signals to the actuators, wherein each pre-defined haptic signal is mapped to a corresponding actuator; and sending each pre-defined haptic signal to its mapped actuator.

16. The computer-implemented method of claim 14, further comprising:

generating one or more secondary haptic signals based on a stored definition, wherein the definition comprises a conditional statement that comprises a condition and a statement, wherein the condition is the generation of one or more primary haptic signals that are sent to a primary actuator, and the statement is an instruction to generate the one or more secondary haptic signals that are sent to a secondary actuator;

mapping the one or more secondary haptic signals to the secondary actuator; and sending each secondary haptic signal to the secondary actuator based on the stored definition.

17. The computer-implemented method of claim 14, further comprising:

dividing at least one haptic signal into haptic signal components;

mapping the haptic signal components to the actuators, wherein each haptic signal component is mapped to a corresponding actuator; and sending the haptic signal components to their mapped actuators.

18. The computer-implemented method of claim 14, further comprising:

combining at least two of the haptic signals into a combined haptic signal;

mapping the combined haptic signal to a mapped actuator; and sending the combined haptic signal to the mapped actuator.

19. A haptic conversion system comprising:

a memory configured to store a haptic conversion module;

a processor configured to execute the haptic conversion module stored on the memory; and actuators configured to output one or more haptic effects;

wherein the haptic conversion module is configured to:
  determine sets of values of audio characteristics of the audio signal, each of the sets of values of audio characteristics comprising at least a frequency, a magnitude or a duration;
  map the sets of values of audio characteristics to actuators, wherein each of the sets of values of audio characteristics is mapped to a different one of the actuators;
  generate haptic signals based on the sets of values of audio characteristics, wherein the haptic signals include a haptic signal generated for each of the sets of values of audio characteristics;
  send the haptic signals to a respective one of the actuators based on the mapping of the sets of values of audio characteristics to the actuators; and
  play the haptic signals at the actuators to generate the one or more haptic effects;

wherein the actuators are included in different regions of a device, wherein the haptic effects are generated based on audio effects, wherein at least two of the audio effects are output from different parts of a surface of the device, wherein the haptic effects are played at the actuators, wherein at least two of the haptic effects are output from different parts of the surface of the device, wherein the actuators play the haptic effects and the audio effects at the same time, wherein at least one haptic effect is generated based on an audio effect being played at a location where a finger of a user is interacting with the surface of the device.

20. The haptic conversion system of claim 19, wherein the haptic conversion module is further configured to:

select one or more pre-defined haptic signals from a universal haptic layer library based on the sets of values of audio characteristics of the audio signal;

map the one or more pre-defined haptic signals to the actuators, wherein each pre-defined haptic signal is mapped to a corresponding actuator; and send each pre-defined haptic signal to its mapped actuator.

21. The haptic conversion system of claim 19, wherein the haptic conversion module is further configured to:

generate one or more secondary haptic signals based on a stored definition, wherein the definition comprises a conditional statement that comprises a condition and a statement, wherein the condition is the generation of one or more primary haptic signals that are sent to a primary actuator, and the statement is an instruction to generate the one or more secondary haptic signals that are sent to a secondary actuator;

map the one or more secondary haptic signals to the secondary actuator; and send each secondary haptic signal to the secondary actuator based on the stored definition.

22. The haptic conversion system of claim 19, wherein the haptic conversion module is further configured to:

divide at least one haptic signal into haptic signal components;

map the haptic signal components to the actuators, wherein each haptic signal component is mapped to a corresponding actuator; and send the haptic signal components to their mapped actuators.

23. The haptic conversion system of claim 19, wherein the haptic conversion module is further configured to:

combine at least two of the haptic signals into a combined haptic signal;

map the combined haptic signal to a mapped actuator; and send the combined haptic signal to the mapped actuator.

24. A device, comprising:

a surface;

actuators located within the surface, wherein each actuator is located in a different region of the surface, and wherein each actuator is configured to output one or more audio effects and one or more haptic effects;

wherein the device is configured to determine sets of values of audio characteristics of the audio signal, each of the sets of values of audio characteristics comprising at least a frequency, a magnitude, or a duration;

wherein the device is further configured to map the sets of values of audio characteristics to the actuators, wherein each of the sets of values of audio characteristics is mapped to a different one of the actuators;

wherein the device is further configured to generate haptic signals based on the sets of values of audio characteristic, wherein the haptic signals include a haptic signal generated for each of the sets of values of audio characteristics;

wherein the device is further configured to send the haptic signals to a respective one of the actuators based on the mapping of the sets of values of audio characteristics to the actuators; and wherein the device is further configured to play the haptic signals at the actuators to generate haptic effects, wherein the haptic effects are generated based on audio effects, wherein at least two of the audio effects are output from different parts of a surface of the device, wherein the haptic effects are played at the actuators, wherein at least two of the haptic effects are output from different parts of the surface of the device, wherein the actuators play the haptic effects and the audio effects at the same time, wherein at least one haptic effect is generated based on an audio effect being played at a location where a finger of a user is interacting with the surface of the device.

25. The device of claim 24, wherein the surface comprises a touchscreen.

\* \* \* \* \*